US006952793B2

(12) United States Patent
Nagasuka et al.

(10) Patent No.: US 6,952,793 B2
(45) Date of Patent: *Oct. 4, 2005

(54) COMPUTER SYSTEM AND METHODS FOR ACQUIRING DUMP INFORMATION AND SYSTEM RECOVERY

(75) Inventors: Hirofumi Nagasuka, Sagamihara (JP); Masahiro Kiyoi, Kawasaki (JP); Yuri Hiraiwa, Sagamihara (JP); Masaya Ichikawa, Yokohama (JP); Hideki Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/464,483

(22) Filed: Jun. 19, 2003

(65) Prior Publication Data

US 2003/0212922 A1 Nov. 13, 2003

Related U.S. Application Data

(63) Continuation of application No. 09/640,017, filed on Aug. 17, 2000, now Pat. No. 6,615,364.

(30) Foreign Application Priority Data

May 18, 2000 (JP) ........................................ 2000-152676

(51) Int. Cl.[7] .............................................. G06F 11/00
(52) U.S. Cl. .................................. 714/5; 714/6; 714/24
(58) Field of Search ............................. 714/5, 6, 15, 24

(56) References Cited

U.S. PATENT DOCUMENTS 5,363,502 A  * 11/1994  Kagimasa et al. ............. 714/6
5,386,552 A    1/1995  Garney ......................... 714/10
5,680,540 A   10/1997  Pearce ......................... 714/24
5,819,024 A   10/1998  Kasuga et al. ................ 714/26
5,905,888 A    5/1999  Jones et al. ................... 713/2
6,543,010 B1   4/2003  Gaudet et al. ................ 714/45

FOREIGN PATENT DOCUMENTS

| JP | 59168998 | 9/1984 |
| JP | 402166533 | 6/1990 |
| JP | 7234808 | 9/1995 |
| JP | 10333944 | 12/1998 |

OTHER PUBLICATIONS

Vleck, T. Van; www.multicians.org/printer.html; Feb. 27, 1996; Multics.

* cited by examiner

Primary Examiner—Scott Baderman
Assistant Examiner—Joshua Lohn
(74) Attorney, Agent, or Firm—Mattingly, Stanger, Malur & Brundidge, P.C.

(57) ABSTRACT

Dump information acquiring and system recovery methods for a computer system using a virtual memory. The computer system has a plurality of external storage units normally used as a paging device unit for holding the contents of the virtual memory to be paged out. When fault occurs, a program for acquiring dump information outputs the contents of the main storage to a dump file. The identifier of the external storage unit set to definition information defining the external storage unit is changed from the identifier of the external storage unit to the identifier of another external storage unit. Thereafter, the computer system is restarted. The contents of the virtual memory held in the paging device unit at the time of fault output to the dump file.

11 Claims, 6 Drawing Sheets

ND METHODS FOR
COMPUTER SYSTEM AND METHODS FOR ACQUIRING DUMP INFORMATION AND SYSTEM RECOVERY

The present application is a continuation of application Ser. No. 09/640,017, filed Aug. 17, 2000, now U.S. Pat. No. 6,615,364 the contents of which are incorporated herein by reference.

BACKGROUND OF THE INVENTION

The present invention relates to a method of acquiring dump information of a computer system necessary for investigating the cause of fault of the computer system.

With recent improvement on a processor performance, the process amount of a program to be executed by one computer and the amount of data to be processed show a steady increase. In order for one computer system to efficiently process data, it is necessary to store a large amount of data directly in a main memory or to develop a large amount of data into a virtual memory. In order to realize this, it is necessary to expand the address spaces of the main memory and virtual memory.

Such expansion of the address spaces of the main and virtual memories increases the amount of information to be acquired to investigate the cause of fault of a system (such information is described hereinafter as dump information).

As the dump information increases, a time taken to acquire the dump information prolongs. This causes a delay of a start time when the system with fault starts again. Therefore, restart of processes is eventually delayed.

Techniques of avoiding a restart delay of a system with fault are known disclosed, for example, in JP-A-7-234808 and JP-A-10-333944.

JP-A-7-234808 discloses a method of acquiring dump information of a computer system having duplicated main memories. According to this disclosed method, when fault occurs in the system, data held in one of the duplicated main memories is used as the dump information, and the system is restarted by using the other main memory to avoid a delay of the restart of the system.

According to the technique disclosed in JP-A-10-333944, prior to restart of the system, dump information in a memory area where a kernel of an operating system is loaded is acquired. Thereafter, a program for restarting the system and a program for sequentially acquiring dump information from another memory area from which the dump information is still not acquired, are executed in parallel. If the dump information in a memory area necessary for system restart is not still acquired, the program for restarting the system restarts the system while dumping the dump information held in the memory area before using. In this manner, the technique disclosed in JP-A-10-333944 shortens the time taken to restart the system.

SUMMARY OF THE INVENTION

According to the above-described techniques, data stored in a main memory is used as dump information when fault occurs. However, if fault occurs in a computer system adopting virtual memory management, it becomes necessary in some cases to acquire dump information paged out to a paging device unit.

In the computer system adopting virtual memory management, in some cases, data in some virtual memory area is output (page-out) to an external storage unit, and when data in the virtual memory area is referred to or updated, the virtual memory area is accessed after the data is input (page-in) to a main memory. The above-described techniques do not consider acquisition of dump information which was paged out and is not stored in the main memory as yet.

Namely, with the above-described techniques, when fault occurs in a computer system, it is not possible to restart the system until the whole dump information paged out in an external storage unit is acquired.

It is an object of the present invention to shorten a time taken to restart a computer system and resume processing jobs, if data in the whole virtual memory area is to be acquired when fault occurs in the system.

In order to achieve the above object of the invention, in a computer system having a processing unit, a computer with a main memory connected to the processing unit, and external storage units connected to the computer, the computer system utilizing virtual memory management realized by mapping an area of a virtual memory used by the processing unit onto the main memory, in response to a fault occurrence of the computer system, data held in the main memory is output to a dump file. Thereafter, the external storage unit which holds the contents of a page of the virtual memory to be paged out from the main memory, is changed from a first external storage unit used before the fault occurs to a second external storage unit. The computer system is restarted by using the second external storage unit as the paging device unit.

According to another aspect of the present invention, a computer system is provided which comprises a processing unit; a main memory; first and second external storage units having an area of a virtual memory used by a program to be executed by the processing unit, the first and second external storage units being used as a paging device unit for holding the contents of the virtual memory area, the contents being paged out from the main memory; and a switching unit interposed between the processing unit and the first and second external storage units, the switching unit accessing one of the first and second external storage units as the paging device unit in response to an access request for the paging device unit issued upon paging of the virtual memory by the program executed by the processing unit, and switching the first and second external storage units as the paging device unit from the one of the first and second external storage units to the other of the first and second external storage units in response to a fault occurrence of a process under execution by the processing unit.

DESCRIPTION OF THE EMBODIMENTS

Figure 1:
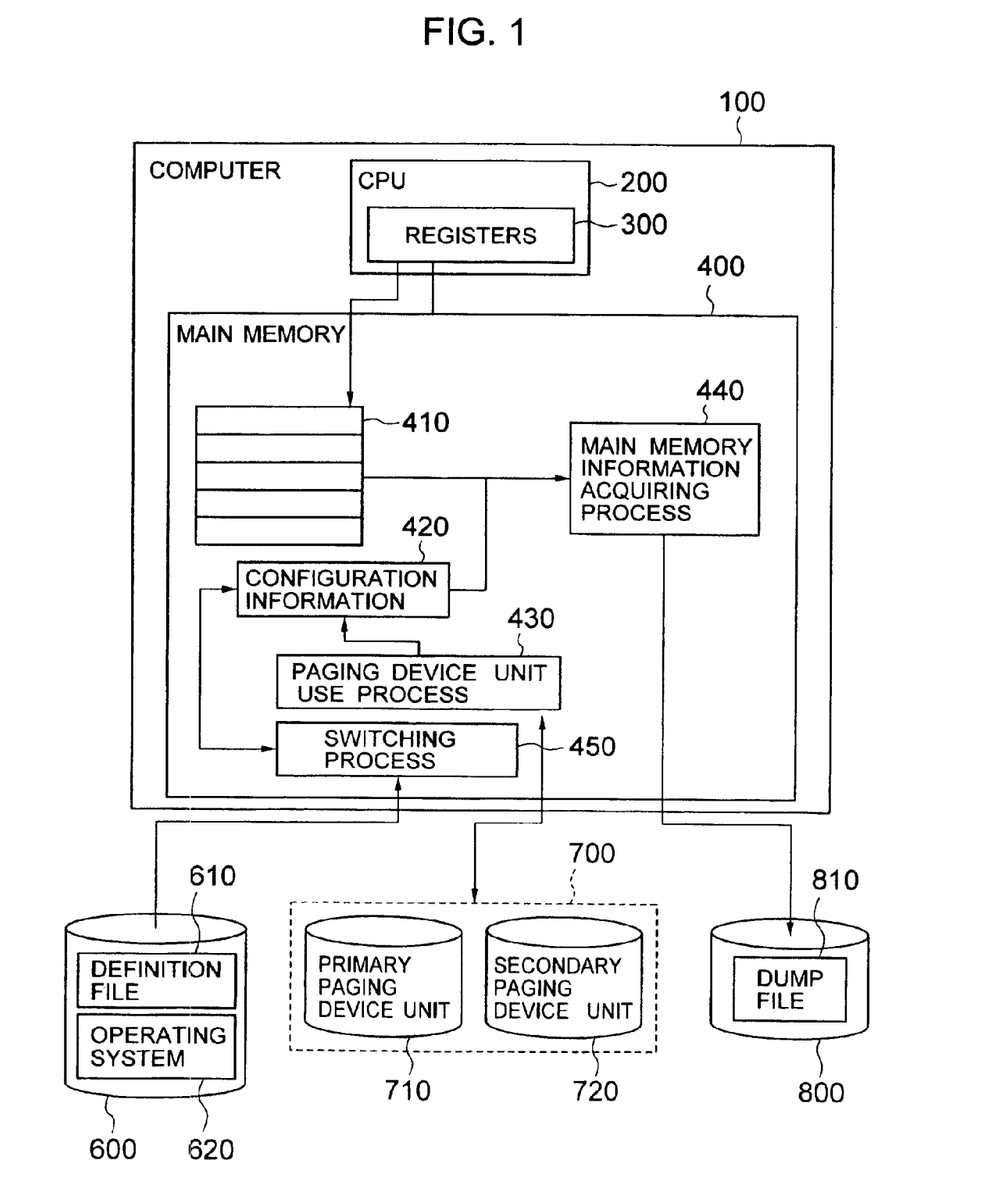
FIG. 1 is a block diagram showing the outline structure of a computer system according to an embodiment of the invention.

FIG. 1 is a block diagram showing the outline structure of a computer system according to an embodiment of the invention.

The computer system of this embodiment has a computer 100 and external storage units 600, 700 (710, 720) and 800 typically a magnetic disk.

The computer 100 has a processor (CPU) 200 for performing various operations and a main memory 400. CPU 200 has registers 300 such as a control register and a general register. The control register holds various control information such as a start real address of an address translation table to be used for accessing the virtual memory. The general register is used for various operations.

The external storage 600 stores therein a definition file 610 and an operating system 620. The operating system 620 is software which manages hardware resources constituting the computer system and a schedule of programs to be executed on the computer 100. The operating system 620 is first loaded when the computer system starts. The definition file 610 stores therein various parameters necessary for the operating system or the like to run the computer system, such as identification information of the external storage units used as paging device units. The external storage unit 700 is used as a paging device unit. In this embodiment, the paging device unit includes a primary paging device unit 710 used as a paging device unit during a normal operation and a secondary paging device unit 720 used as a substitution. The definition file 610 defines an identifier of the external storage unit 710 as the primary paging device unit and an identifier of the external storage unit 720 as the secondary paging device unit. The external storage unit 800 has a dump file 810. The dump file 810 stores the whole dump information of the computer system including the dump information in the main memory 400 when fault occurs in the system.

The main memory 400 has a register save area 410 in a predetermined memory area. The register save area 410 is used for saving the contents held in each register of the registers 300 when any fault occurs during system running. Configuration information 420 held in the main memory 400 includes the identifier of an external storage unit currently used as the paging device unit. The main memory 400 stores programs to be executed by CPU 200 for realizing a paging device unit use process 430, a main memory information acquiring process 440 and a switching process 450.

The paging device unit use process 430 acquires the identifier, contained in the configuration information 420, of an external storage unit currently used as the paging device unit and executes a paging process by using the identified external storage unit. The paging process is a process of outputting data in the main memory 400 in an area having a small access frequency to the paging device unit when a use factor of the main memory 400 becomes high and an empty area becomes small, and a process of inputting data in a virtual memory area in the main memory 400 if the data in the virtual memory area to be accessed by CPU 200 was output to the paging device unit.

The main memory information acquiring process 440 is a process of acquiring the contents held in the main memory 400 sequentially in an ascending order starting from an address 0 and outputting the contents to the dump file 810, when fault occurs in the system. The switching process 450 is called and executed when the main memory information acquiring process 440 is completed. The switching process 450 acquires the identifier of the external storage unit 700 currently used as the paging device unit from the configuration information 420, and changes the setting of the identifier of an external storage unit so that the secondary paging device unit 720 is used as a primary paging device unit when the computer system restarts. In this manner, the external storage unit 710 used as a primary paging device unit until the fault occurs is prevented from being used as a secondary paging device unit after the restart of the computer system.

Figure 2:
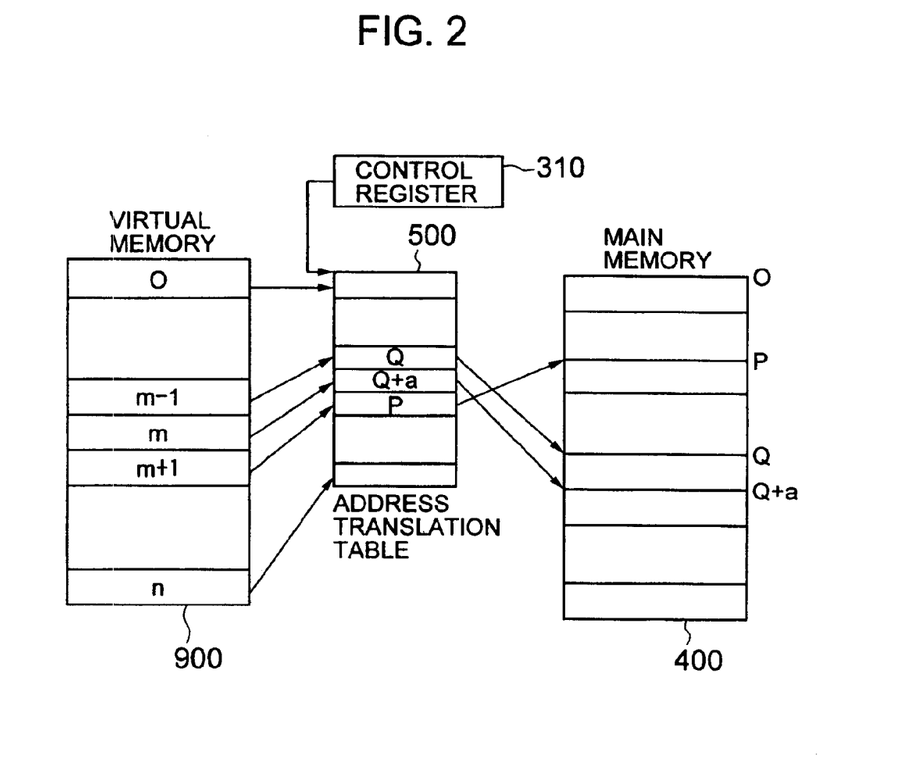
FIG. 2 is a diagram illustrating a method of translating a virtual address into a real address and the relationship between a virtual memory and a main memory.

FIG. 2 is a diagram illustrating a method of translating a virtual address into a real address and the relationship between a virtual memory and a main memory.

A virtual memory 900 is partitioned into units having a predetermined size. This partitioned unit is generally called a page. In FIG. 2, the virtual memory 900 is constituted of n+1 pages. The pages include page 0, page 1, page 2, . . . , page n, as counted from the start page of the virtual memory. Areas of the virtual memory 900 are allocated in the page unit to the main memory 400 or primary paging device unit 710.

The area of the main memory 400 is also partitioned into units having the same size as the page of the virtual memory 900. The page sizes of the virtual memory 900 and main memory 400 are made equal so that each page in the virtual memory 900 can be easily referred to a corresponding page in the main memory 400. The address translation table 500 manages to which area of the main memory 400 or primary paging device unit 710 each page of the virtual memory 900 is allocated. The address translation table 500 is disposed in continuous areas of the main memory 400, and has n+1 entries corresponding to the pages of the virtual memory 900. In this embodiment, the order of pages of the virtual memory 900 corresponds to the order of pages of the address translation table 500. For example, the entry of the address translation table 900 corresponding to the m-th page (page m−1) of the virtual memory 900 is the m-th entry. The real address of the start entry of the address translation table 900 is held in a control register 310 of the register group 300.

Figure 3:
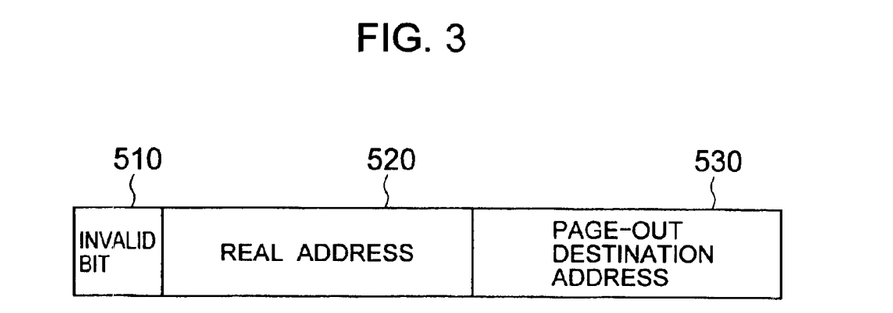
FIG. 3 is a diagram showing the data structure of one entry of an address translation table.

FIG. 3 shows the data structure of one entry of the address translation table. Each entry of the address translation table 500 holds information including an invalid bit 510, a real address 520, and a page-out destination address 530.

The invalid bit 510 indicates whether the real address 520 is invalid or not. If the invalid bit 510 is set to "1" it means that the real address 520 is invalid. More specifically, the page of the virtual memory 900 corresponding to this entry is not used or data in this page was paged out into the primary paging device unit 710 at the page-out destination address 530.

If the invalid bit 510 is set to "0", the real address 520 is valid and data in the page of the virtual memory corresponding to this entry is already held in the main memory 400 at the real address 520. For example, it is assumed as shown in FIG. 2 that "Q" is set as the real address 520 in the entry corresponding to the page m−1 of the address translation table, "Q+a" (where a is the size of one page) is set as the real address 520 in the entry corresponding to the page m, "P" is set as the real address 520 in the entry corresponding to the page m+1, and "0" is set as the invalid bit of these entries. In this case, data in pages m−1 and m of the virtual memory 900 are stored in continuous areas of the main memory at addresses starting from the real address Q, and data in page m+1 is stored in an area at addresses starting from the real address P.

Figure 4:
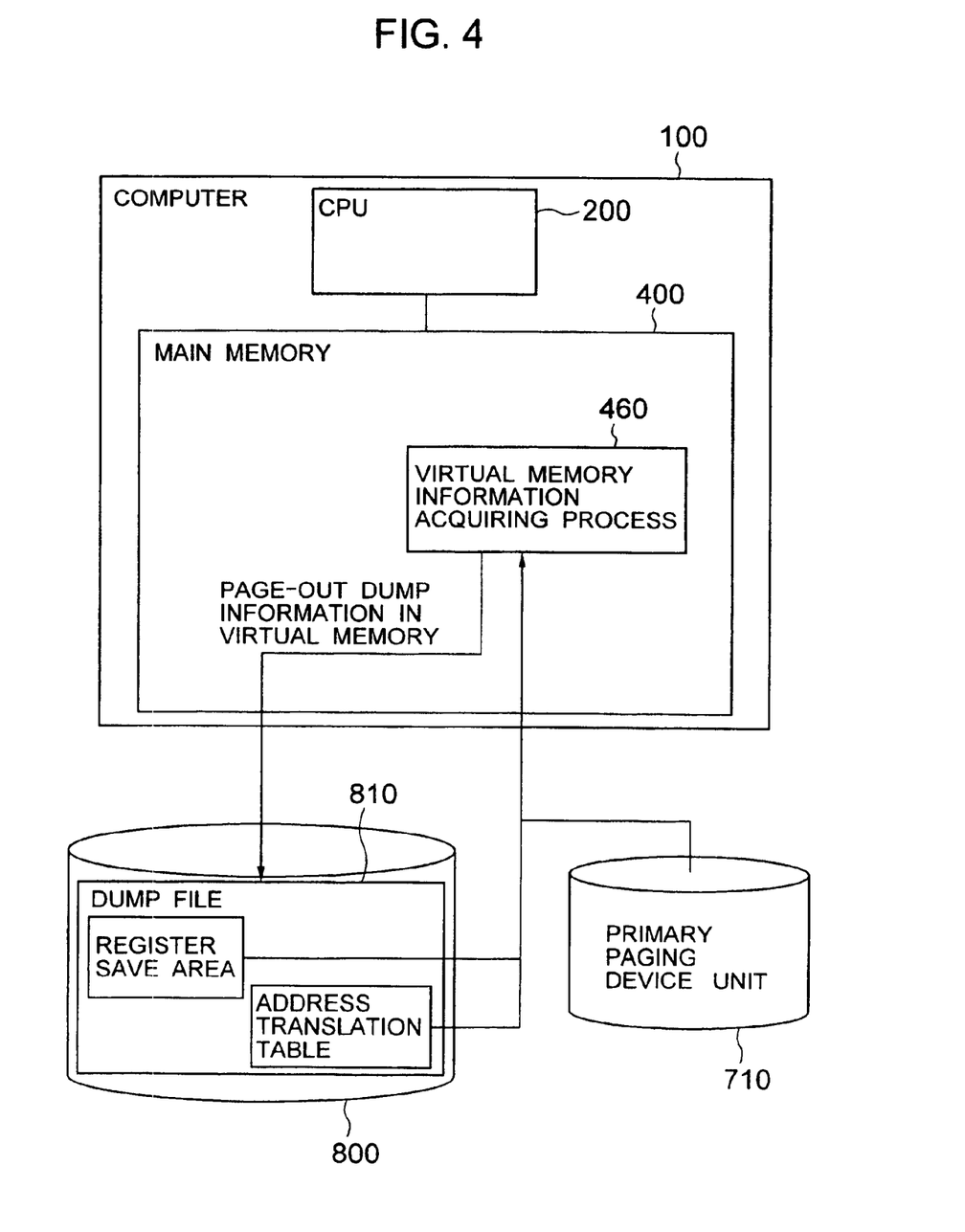
FIG. 4 is a diagram illustrating the outline of a virtual memory information acquiring process.

FIG. 4 is a diagram illustrating the outline of a virtual memory information acquiring process.

The virtual memory information acquiring process 460 is executed by using, as its input information, the contents of the register save area and address translation table output to the dump file 801 by the main memory information acquiring process 440 and the contents held in the external storage unit 710 used as the paging device unit before fault occurs in the computer system. In accordance with the input information, the virtual memory information acquiring process 460 acquires page data in the virtual memory 900 paged out into the paging device unit 710 and outputs the page data to the dump file 801, when the fault occurs in the computer system.

After the process by the main memory information acquiring process 440 is completed, the virtual memory information acquiring process 460 may be executed by the computer system used before the fault occurs or another computer system.

Figure 5:
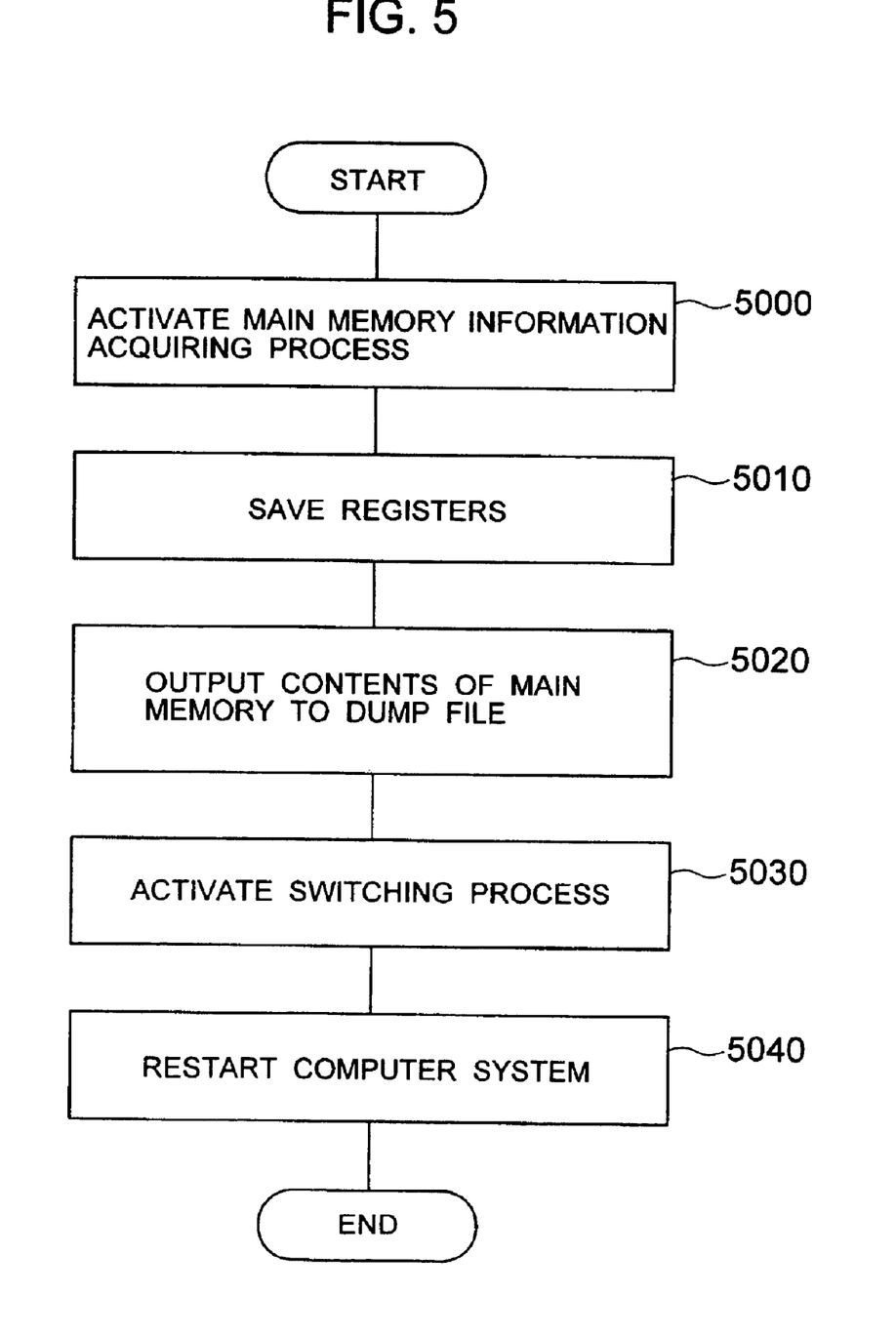
FIG. 5 is a flow chart illustrating a computer system restart process.

FIG. 5 is a flow chart illustrating a restart operation of the computer system to be executed when fault occurs in the computer system.

When fault occurs in the computer system while the paging device unit use process 430 is executed for the virtual memory, the main memory information acquiring process 440 is activated to start acquiring dump information (Step 5000). Next, the contents of the registers 300 are saved in the register save area 410 of the main memory 400 (Step 5010). Thereafter, the main memory information acquiring process 440 reads the contents of the main memory 400 sequentially starting from address "0" and stores the read contents in the dump file 810 (Step 5020).

After the contents of the main memory 400 are output to the dump file 810, the switching process 450 is activated (Step 5030). By referring to the configuration information, the switching process 450 changes the identifier of the external storage unit 710 used as the paging device unit to the identifier of the external storage unit 720 as the secondary paging device unit. Thereafter, the operating system 620 is loaded to restart the system. If the configuration information 420 is to be generated when the system is restarted, in accordance with the information of the paging device unit set in the definition file 610 is updated (Step 5040).

Figure 6:
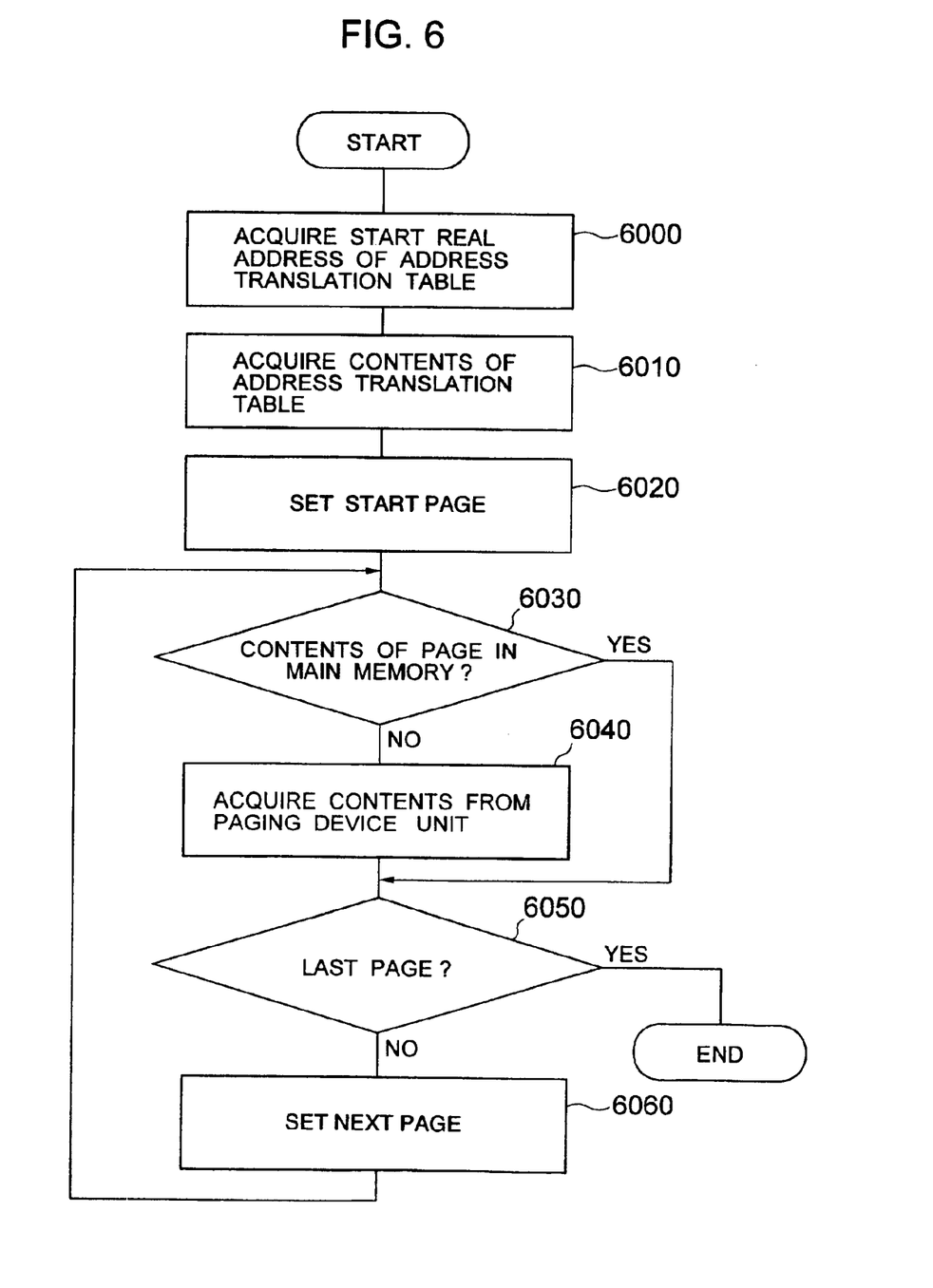
FIG. 6 is a flow chart illustrating a virtual memory information acquiring process.

FIG. 6 is a flow chart illustrating the operation of the virtual memory information acquiring process 460. This process is executed by another computer system after the computer system restart process at Step 5040.

When the virtual memory information acquiring process 460 is activated, it acquires a start real address of the address translation table 500 held in the control register 310 from the dump file 810, among the contents of the register save area 410 in the main storage 400 (Step 6000). The dump file 810 holds the contents of the main memory 400 at the time when the fault occurred, in the address sequential order. Therefore, if the address of the register save area 410 in the main memory 400 is given in advance, the contents of each register can be easily obtained.

In accordance with the acquired real address, the virtual memory information acquiring process 460 acquires the contents of the address translation table 500 from the dump file 810 (Step 6010). Next, the virtual memory information acquiring process 460 sets the first page as a page of the virtual memory 900 to be checked (Step 6020). Namely, the first entry of the address translation table 500 is checked. The virtual memory information acquiring process 460 checks the state of the invalid bit 510 in the first entry of the address translation table 500 to judge whether the data corresponding to the first page of the virtual memory 900 was stored either in the main memory 400 or in the paging device unit when the fault occurred (Step 6030).

If the invalid bit 510 is "1', which means that the data corresponding to the first page of the virtual memory 900 is stored in the paging device unit, the contents corresponding to the first page are read from the paging device unit in accordance with the page-out destination address 530 and output to the dump file 810 (Step 6040). In this case, the virtual memory information acquiring process 460 adds an address of the page in the virtual memory 900 to the dump information output to the dump file 810. It is therefore possible to check the page of the virtual memory 900 corresponding to the output dump information.

If it is judged at Step 6030 that the invalid bit 510 is "0" which means that data corresponding to the first page is stored in the main memory 400 when the fault occurred, and that the data was stored in the dump file 810 at Step 5020. In this case, the flow advances to Step 6050.

At Step 6050, the virtual memory information acquiring process 460 checks whether the processed entry is the last entry. If not, at Step 6060 the next entry is set as an entry to be checked to thereafter return to Step 6030 to acquire virtual memory information. If the processed entry is the last entry, it means that all dump information has been acquired. The process is therefore terminated.

According to this embodiment, when fault occurs in a computer system, the current external storage unit used as the paging device unit is switched to another external storage unit, and the computer system is restarted. Accordingly, before the contents in a virtual memory area paged out into the paging device unit are acquired as the dump information, the computer system can be restarted. It is possible to shorten a delay of the restart time after fault occurrence. The virtual memory information acquiring process can be executed at any time desired so that the running flexibility of the computer system can be improved.

In this embodiment, although the virtual memory information acquiring process is executed by another computer system, it may be executed in a background environment while the computer system executes usual processes after the restart. In this case, it is not necessary to use another computer system for acquisition of virtual memory information.

Figure 7:
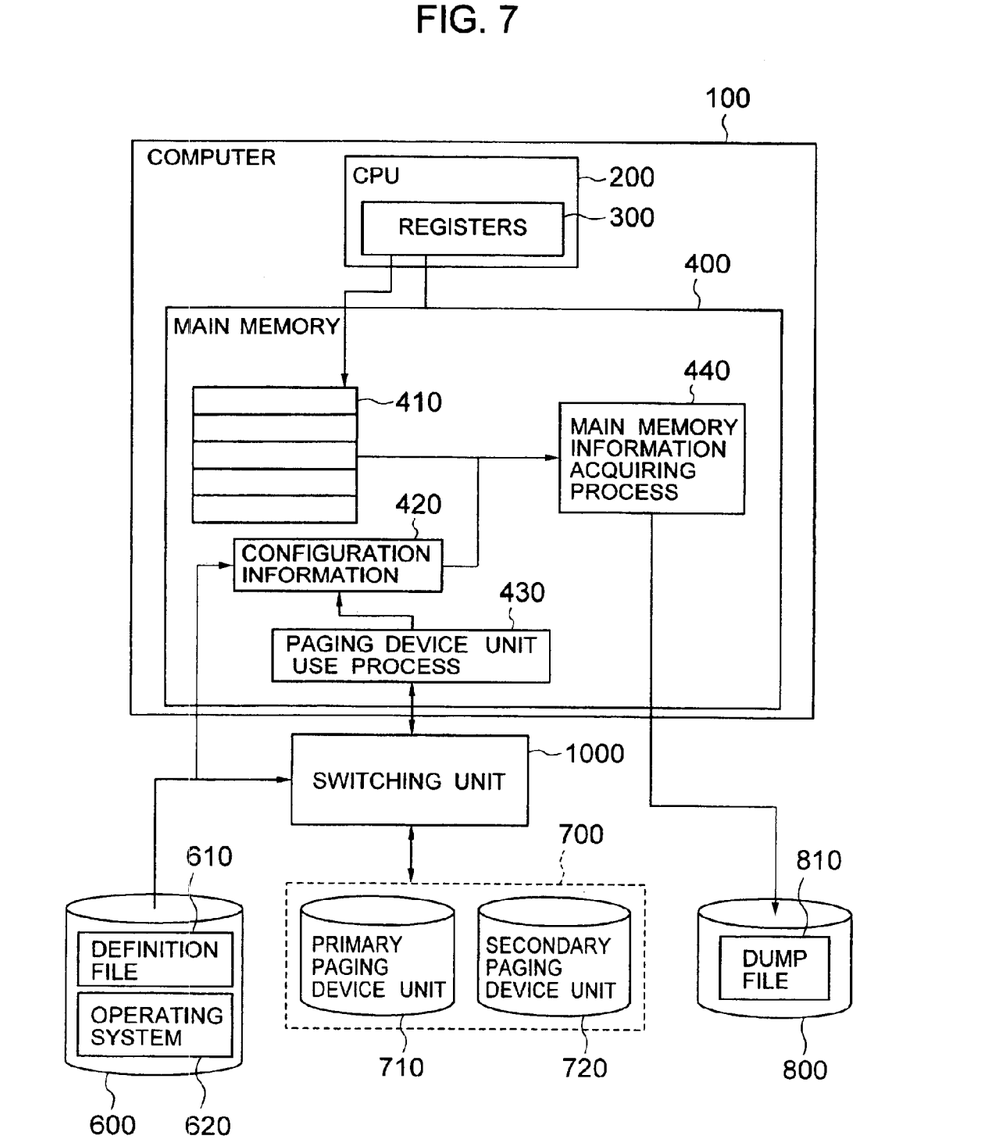
FIG. 7 is a block diagram showing the outline structure of a computer system according to a second embodiment.

FIG. 7 is a block diagram showing the outline of a computer system according to a second embodiment of the invention.

The computer system of this embodiment has a switching unit 1000 for switching between external storage units used as a paging device unit, in place of the switching process to be executed by the computer 100. The other structures are same as those of the first embodiment. In FIG. 7, although the switching unit 1000 is externally connected to the computer 100, it may be built in the computer 100.

The definition file 610 of this embodiment defines that the external storage unit 700 is used as a paging device unit. The definition file 610 also stores the information that the external storage unit 700 includes an external storage unit 710 and an external storage unit 720 and that the external storage unit 710 is used as an external storage unit during the normal operation of the system.

When the computer system starts, the contents of the definition file 610 are loaded in the main memory 400 in a predetermined area as part of the configuration information 420. During the normal operation of the computer system, the paging device unit use process 430 refers, when paging becomes necessary, to the configuration information 420 and issues a paging input/output request to the switching unit 1000 for selecting the paging device unit 700. Upon reception of the input/output request for the external storage unit 700, the switching unit 1000 passes the input/output request to the paging device unit during the normal operation (in this example, the external storage unit 710).

When a failure occurs in the computer system, CPU 200 notifies a fault occurrence to the switching unit 1000. Upon reception of this notice, the switching unit 1000 refers to the configuration information 420 and changes the settings so that the secondary paging device unit 720 is used as the paging device unit. Thereafter, the operating system 620 is loaded and the system is restarted. After the system restarts, in response to a paging input/output request issued from the paging device unit use process 430, the switching unit 1000 passes the input/output request to the external storage unit 720.

In this embodiment, when executing paging, the paging device unit use process does not consider which of the primary and secondary paging device units is used as the paging device unit, but the switching unit itself selects the external storage unit used as the paging device unit. Therefore, similar to the first embodiment, the dump information in the paging device unit can be acquired when fault occurs, after the computer system is restarted. The time taken to restart the system can therefore be shortened. The dump information can be acquired after the switching unit selects the new external storage unit to be used as the paging device unit, by connecting the old external storage unit used as the paging device unit before the fault to another computer system.

In this embodiment, the switching unit switches between the external storage units upon reception of a signal notifying a fault occurrence from CPU. The switching may be executed upon reception of a command from a system administrator via a terminal equipment.

According to the embodiments described above, in a computer system using virtual memory management, the system restart process can be executed immediately after the dump information in the main memory is acquired. A time taken to restart the system after a fault occurrence, i.e., a system halt time, can be shortened. Dump information in the virtual memory can be acquired by a computer system different from the computer system used before the fault occurrence and executing a job. The computer system running flexibility can therefore be improved.

What is claimed:

1. A computer system, comprising:

a processing unit;

a main memory; and first and second external storage units having an area of a virtual memory used by a program to be executed by the processing unit, the first and second external storage units being used as a paging device unit for holding contents of the virtual memory area, the contents being paged out from the main memory, wherein the processing unit accesses one of the first and second external storage units as the paging device unit in accordance with an access request for the paging device unit issued upon paging of the virtual memory by the program executed by the processing unit, and wherein the processing unit switches an external storage unit used as the paging device unit from one of the first and second external storage units to the other of the first and second external storage units in response to an occurrence of a fault in a process under execution by the processing unit.

2. The computer system according to claim 1, further comprising:

a third external storage unit for holding a dump file which records dump information, wherein the processing unit outputs the dump information held in the main memory to the dump file in response to the occurrence of the fault, and restarts the computer system after completion of outputting the dump information to the dump file.

3. A computer system, comprising:

a processing unit;

a main memory; and first and second external storage units having an area of a virtual memory used by a program to be executed by the processing unit, the first and second external storage units being used as a paging device unit for holding contents of the virtual memory area, the contents being paged out from the main memory, wherein the processing unit outputs data held in the main memory as a dump file in response to an occurrence of a fault in a process under execution by the processing unit, and changes an identifier set as definition information for identifying an external storage unit used as a paging device unit which holds contents of a page of the virtual memory to be paged out from the main memory, from an identifier of a first external storage unit used as an identifier of a second external storage unit, and wherein the processing unit restarts the computer system with the second external storage unit being used as the paging device unit, in accordance with the definition information thus changed.

4. The computer system according to claim 3, wherein the processing unit saves contents of a register in the processing unit in a predetermined area of the main memory, before outputting the data to the dump file.

5. The computer system according to claim 3, wherein the processing unit reads contents of a page of the virtual memory held in the first external storage unit, and outputs the page thus read of the virtual memory to the dump file.

6. The computer system according to claim 5, wherein the processing unit acquires an address translation table from the dump file, the address translation table being used for mapping the area of the virtual memory onto an area of the main memory, and checks contents of the area of the virtual memory paged out into the first external storage unit, in accordance with the address translation table.

7. A computer coupled to a first external storage unit and a second external storage unit, comprising:

a processing unit; and a main memory, wherein the processing unit accesses one of the first and second external storage units as a paging device unit in accordance with an access request for the paging device unit issued upon paging of a virtual memory by a program executed by the processing unit, and wherein the processing unit switches an external storage unit used as the paging device unit from one of the first and second external storage units to the other of the first and second external storage units in response to an occurrence of a fault in a process under execution by the processing unit.

8. The computer according to claim 7, wherein one of the first and second external storage units has an area of a virtual memory used by a program to be executed by the processing unit, and is used as a paging device unit for holding contents paged out from the main memory.

9. A computer coupled to a first external storage unit and a second external storage unit, comprising:
 a processing unit; and
 a main memory,
 wherein the processing unit outputs data held in the main memory as a dump file in response to an occurrence of a fault in a process under execution by the processing unit, and changes an identifier set as definition information for identifying an external storage unit used as a paging device unit which holds contents of a page of a virtual memory to be paged out from the main memory, from an identifier of a first external storage unit used to an identifier of a second external storage unit, and wherein the processing unit restarts the computer system with the second external storage unit being used as the paging device, in accordance with the definition information thus changed.

10. The computer according to claim 9, wherein one of the first and second external storage units has an area of a virtual memory used by a program to be executed by the processing unit, and is used as a paging device unit for holding contents paged out from the main memory.

11. The computer according to claim 9, wherein the computer is coupled to a third external storage unit, and the processing unit outputs the dump file to the third external storage unit.

* * * * *